United States Patent [19]
Caminos

[11] Patent Number: 5,774,937
[45] Date of Patent: Jul. 7, 1998

[54] HANDLE ADAPTER

[76] Inventor: Frank Caminos, 1979 Crooked Oak Dr., Lancaster, Pa. 17601

[21] Appl. No.: 795,411

[22] Filed: Feb. 5, 1997

Related U.S. Application Data

[60] Provisional application No. 60/011,213, Feb. 6, 1996.

[51] Int. Cl.$^6$ .............................. A47B 95/02; A47J 45/10
[52] U.S. Cl. .................. 16/114 R; 16/110 A; 220/755; 220/914; 220/759
[58] Field of Search .............. 16/110 A, 114 R, 16/110 R, 111 R; 220/755, 914, 759, 753, 912; 43/25

[56] References Cited

U.S. PATENT DOCUMENTS

| | | | |
|---|---|---|---|
| 607,154 | 7/1898 | Berck | 294/58 |
| 712,843 | 11/1902 | Paul . | |
| 1,112,475 | 10/1914 | Pospychala . | |
| 1,388,958 | 8/1921 | Lafond | 220/753 |
| 1,499,670 | 7/1924 | Kuno | 220/753 |
| 2,133,252 | 10/1938 | Moore et al. . | |
| 2,731,663 | 1/1956 | Thompson . | |
| 2,734,221 | 2/1956 | Trapani . | |
| 3,342,517 | 9/1967 | Pryce | 220/753 |
| 3,372,510 | 3/1968 | Arsenault | 43/25 |
| 3,426,385 | 2/1969 | Gutshall | 16/125 |
| 3,438,082 | 4/1969 | Jones et al. | 16/114 |
| 3,484,894 | 12/1969 | Fletcher | 16/114 R |
| 3,648,887 | 3/1972 | Hartley | 220/94 |
| 3,798,706 | 3/1974 | Wolfson et al. | 16/114 A |
| 4,924,924 | 5/1990 | Stewart | 16/114 R |
| 5,065,475 | 11/1991 | Watt | 16/114 R |
| 5,159,775 | 11/1992 | Sutula | 43/21.2 |
| 5,313,735 | 5/1994 | Latouche | 43/25 |
| 5,451,085 | 9/1995 | Wagner | 294/58 |

FOREIGN PATENT DOCUMENTS

| | | | |
|---|---|---|---|
| 353677 | 7/1931 | United Kingdom | 16/110 A |

*Primary Examiner*—Chuck Mah
*Attorney, Agent, or Firm*—Weingram & Associates, P.C.

[57] ABSTRACT

A handle adapter provided for a cooking utensil consists of a one piece integral portion mounted to the cooking utensil so that the user can ergonomically grip and control the cooking utensil. The adapter consists of a one-piece arm bent to provide a shielding portion to protect the user's hand from the heated materials in the cooking utensil, a gripping portion ergonomically shaped to reduce stress on the user's wrist, and a support portion extending from the gripping portion constructed and arranged to conform substantially to the user's arm. The gripping portion and support portion coact with each other, and are constructed of materials to facilitate control of the adapter and comfort during a cooking operation.

20 Claims, 9 Drawing Sheets

FIG. 7
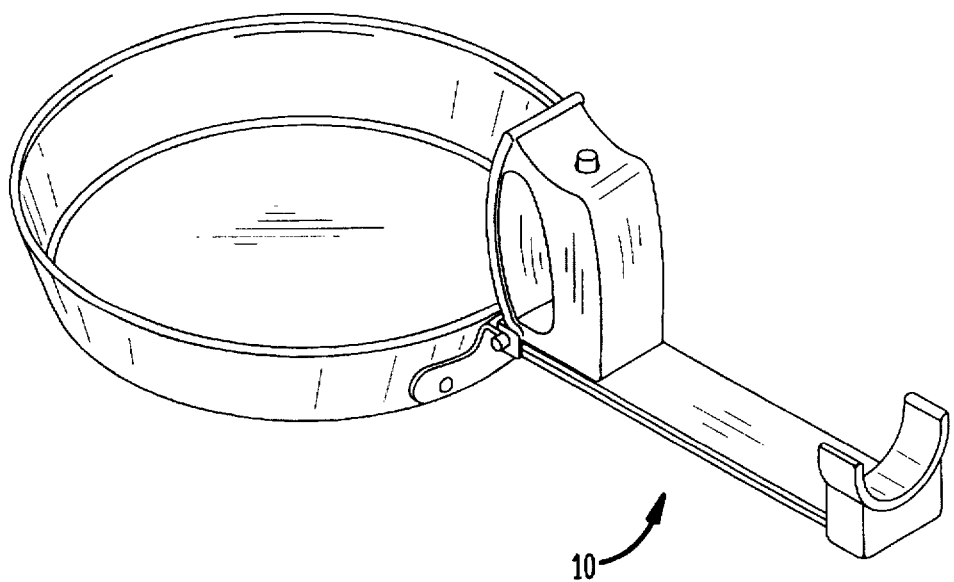
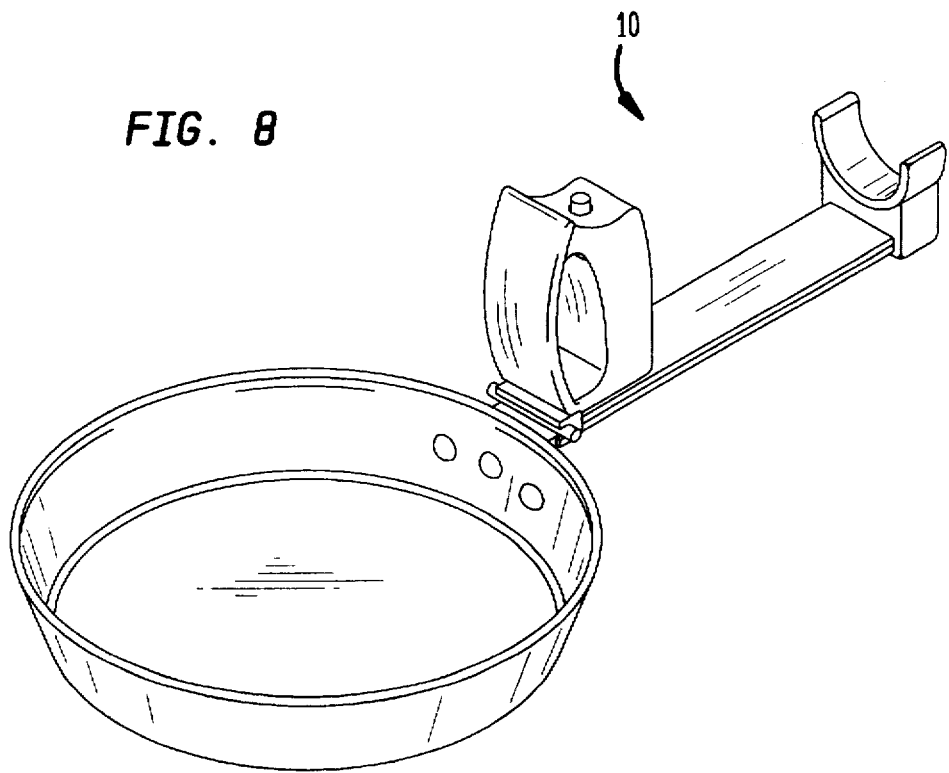
FIG. 8

HANDLE ADAPTER

This application claims the benefit of U.S. Provisional Application 60/011,213, filed Feb. 6, 1996.

BACKGROUND OF THE INVENTION

1. Field of the Invention

The present invention relates to handle adapters for cooking utensils such as pots, pans and the like, and particularly to those adapters which can be retrofitted to a pot handle and are constructed to receive interchangeable mounting assemblies to enable the adapter to releasably engage pot handles of different constructions. The invention also relates to a cooking utensil having a non-removable handle which provides hand and wrist support to promote single hand manipulation of the utensil.

2. Description of the Related Art

Attachments for hand tools and cooking utensils are known to facilitate the operation of such devices to reduce fatigue often experienced by the user, especially in circumstances involving repetitive motion of the tools or utensils. Certainly in commercial operations, fatigue can impact on the accuracy and effectiveness of the user in controlling the hand tool or cooking utensil and therefore, various apparatus have been developed to alleviate this and other problems experienced by the user. Such apparatus are disclosed in the following patents:

| U.S. PAT. NO. | INVENTOR(S) |
|---|---|
| 607,154 | Berck |
| 712,843 | Paul |
| 1,112,475 | Pospychala |
| 2,133,252 | Moore et al. |
| 2,731,663 | Thompson |
| 2,734,221 | Trapani |
| 3,426,385 | Gutshall |
| 3,438,082 | Jones et al. |
| 3,648,887 | Hartley |
| 3,798,706 | Wolfson et al. |
| 5,065,475 | Watt |
| 5,159,775 | Sutula |
| 5,313,735 | Latouche |
| 5,451,085 | Wagner |

For example, U.S. Pat. No. 607,154 to Berck discloses a scoop with an attachment placed on the end of the handle to enable one-handed use of the scoop.

U.S. Pat. No. 712,843 to Paul discloses a pneumatic sugar cane cutter having an elbow guide and having the end of the pneumatic cutter formed in a pistol grip for the palm of the hand. This pistol grip is integrally formed onto the end of the barrel of the pneumatic tool.

U.S. Pat. No. 5,159,775 to Sutulak, Jr. discloses a wrist support device for a fishing rod. Grips are provided around the wrist and the elbow section of the forearm to permit freedom of use of the hand on the reel without requiring the hand to grasp the fishing rod.

U.S. Pat. No. 5,313,735 to Latouche discloses a wrist support device which allows the forearm to relieve the wrist of the strength required for holding various implements such as fishing rods, nets, frying pans (FIG. 8) or other cooking utensils (FIG. 13). This device can be attached to walkers (FIG. 14).

U.S. Pat. No. 5,451,085 to Wagner discloses a tool handle for one-handed use of various tools by means of a bent PVC tubing which is clamped to the shaft of the various tools.

U.S. Pat. Nos. 2,734,221 to Trapani, 1,112,475 to Pospychala, 3,438,082 to Jones et al., 3,648,887 to Hartley, 3,798,706 to Wolfson et al., and 2,133,252 to Moore et al. disclose various handle devices for attachment to cooking implements.

U.S. Pat. No. 5,065,475 to Watt discloses a handle extension device for long shafted items.

Among the patents identified above, however, none disclose an adapter for handles which includes a grip constructed to receive interchangeable, releasable engagement assemblies for use with different cooking utensil handles. None of the patents above provide a device which has this feature in combination with a bracing member to permit the user's forearm to counterbalance the weight of the cooking utensil to reduce fatigue and increase control of the utensil handle.

OBJECTS AND SUMMARY OF THE INVENTION

It is an object of the present invention to provide a handle adapter for pots, pans, cooking utensils and the like which is constructed for releasable engagement to such devices to enhance user effectiveness and substantially reduce fatigue when using such devices.

It is another object of the present invention to provide a handle adapter which is ergonomically constructed to enable the user to keep the forearm parallel with the handle of the cooking utensil such that an axis through the fist of the user remains substantially perpendicular to the handle of the utensil. it is another object of the present invention to provide a handle adapter which is constructed of a polymer, alloy or polymeralloy combination which is easily manufactured by molding or other conventional methods and does not deteriorate in the presence of cooking heat and chemicals.

It is another object of the present invention to provide a handle adapter which is lightweight and relatively inexpensive to manufacture and maintain.

It is another object of the present invention to provide a handle adapter which permits the user to brace the cooking utensil to withstand axial rotation so that the cooking utensil can remain positioned where desired and which is easily and securely attached and detached to the handle of the cooking utensil.

It is another object of the present invention to provide a handle adapter with a grip which is ergonomically contoured for grasping comfortably and reliably by the human hand.

It is another object of the present invention to provide a handle adapter with a shield portion constructed to protect the fingers and knuckles from exposure to heated substances to which the cooking utensil is applied.

It is another object of the present invention to provide a handle adapter with a grip portion constructed to receive interchangeable locking mechanisms, each of such locking mechanisms adapted for use with a corresponding type of cooking utensil handle.

Yet another object of the invention is to provide a handle adapter which permits single hand manipulation of the utensil so the other hand is free to stir, serve or adjust the flame.

It is another object of the invention to provide a handle adapter which allows the user to manually grasp the handle of a cooking utensil which may otherwise be too hot to grasp without auxiliary thermal insulating means such as oven mitts.

It is a further object of the present invention to provide a cooking utensil handle constructed to receive a handle adapter to better control the cooking utensil.

A further object of the invention is to provide a cooking utensil having a non-removable handle which provides hand and wrist support and which is easy to grasp and manipulate.

The objects of the present invention are implemented by providing a handle adapter which is removably mountable to a cooking utensil, the handle adapter consisting of a bracing member, a hand grip fixedly attached to the bracing member and having a body portion that is grasped and a shield portion extending from and spaced forwardly at the body portion to protect the user's hand from heat and flames. A means is provided to removably mount the adapter to the handle of the cooking utensil.

BRIEF DESCRIPTION OF THE DRAWINGS

For a more complete understanding of the present invention, reference may be had to the following description of exemplary embodiments of the present invention considered in connection with the accompanying drawings, of which:

FIG. 7 shows a perspective view of the preferred embodiment of thhandle adapter according to the present invention;

FIG. 8 shows another perspective view of the handle adapter;

DETAILED DESCRIPTION OF THE PREFERRED EMBODIMENTS

In FIGS. 1–6, the handle adapter of the preferred embodiment of the present invention is shown removably mounted to a handle of a frying pan, although the handle adapter of the present invention can be removably mountable to other cooking utensils and/or tools. In this particular arrangement, the pan handle has been adapted with elements to facilitate the removable mounting of the handle adapter to the handle.

By way of example and for understanding the present invention, reference will be had throughout the disclosure identifying the cooking utensil as a frying pan to which the handle adapter is removably mounted. It will be understood that other cooking utensils and/or tools have the necessary structure to permit the handle adapter to coact therewith to obtain the advantages of the present invention. In addition, the handle adapter device of the present invention will be hereinafter referred to as the "adapter", while the cooking utensil will be identified by its elements of a handle and a pan to avoid any confusion between the elements of the adapter and the elements of the cooking utensil.

Referring to FIGS. 2–8, the adapter 10 is removably mounted to the pan 12 so that a user can employ the pan 12 effectively. As shown in particular in FIGS. 2–4, the user's forearm is supported while the hand grips an ergonomically shaped grip 14 to mount the adapter 10 to the handle 16 of the cooking utensil and control the use thereof.

In FIGS. 9–12, the construction and arrangement of the elements of the adapter 10, and the coaction with the pan handle 16 are shown.

It is advantageous to have a pan handle 16 which will be employed in numerous operations, specifically formed for the adapter 10, although as will be explained below with regard to other embodiments of the present invention, this is not always necessary.

Figure 1:
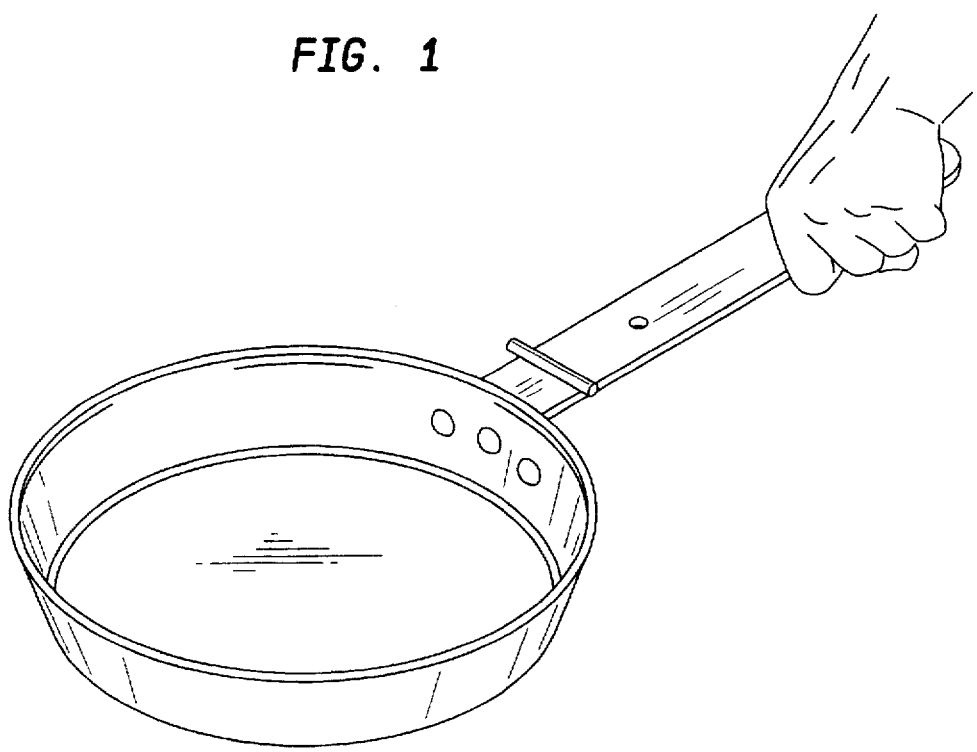
FIG. 1 shows the conventional way in which a cooking utensil, such as a frying pan is held for use.
Figure 2:
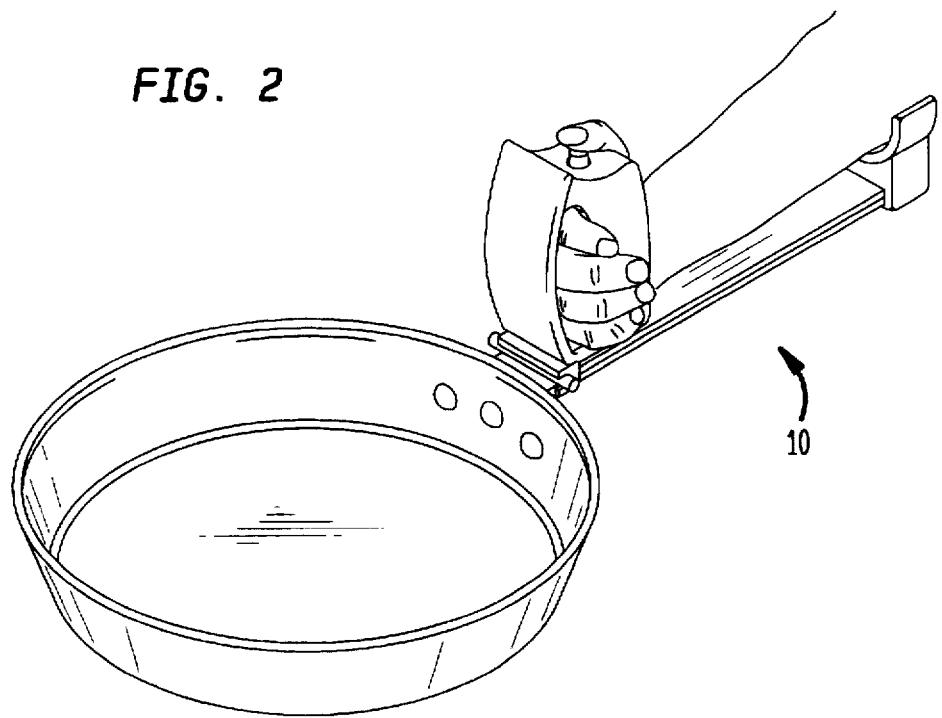
FIGS. 2–6 show the cooking utensil having a preferred embodiment of a handle adapter of the present invention releasably engaged thereto.
Figure 3:
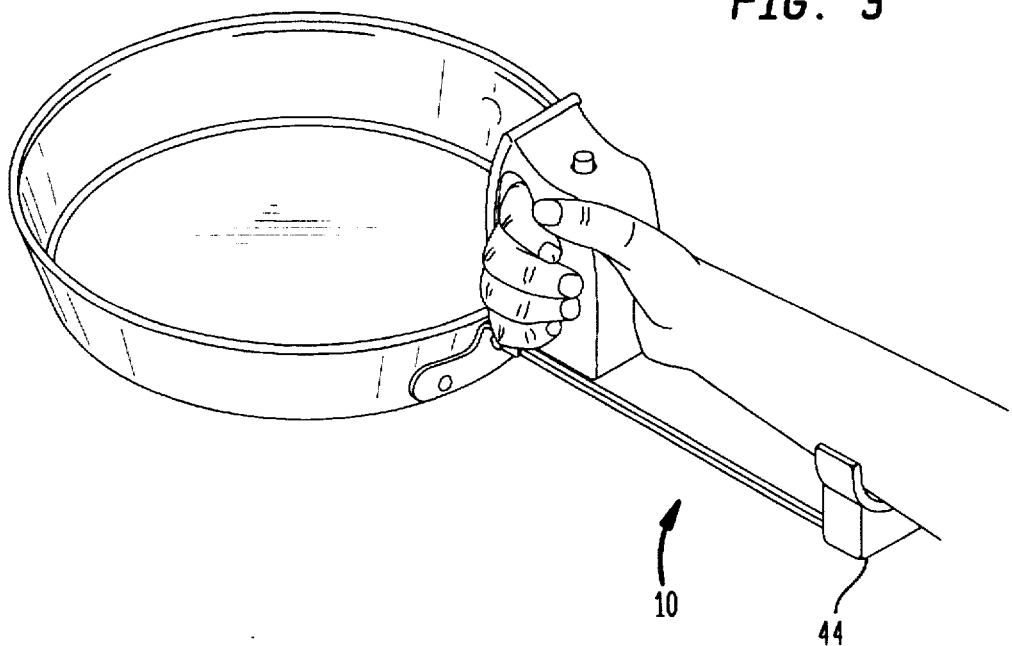
Figure 4:
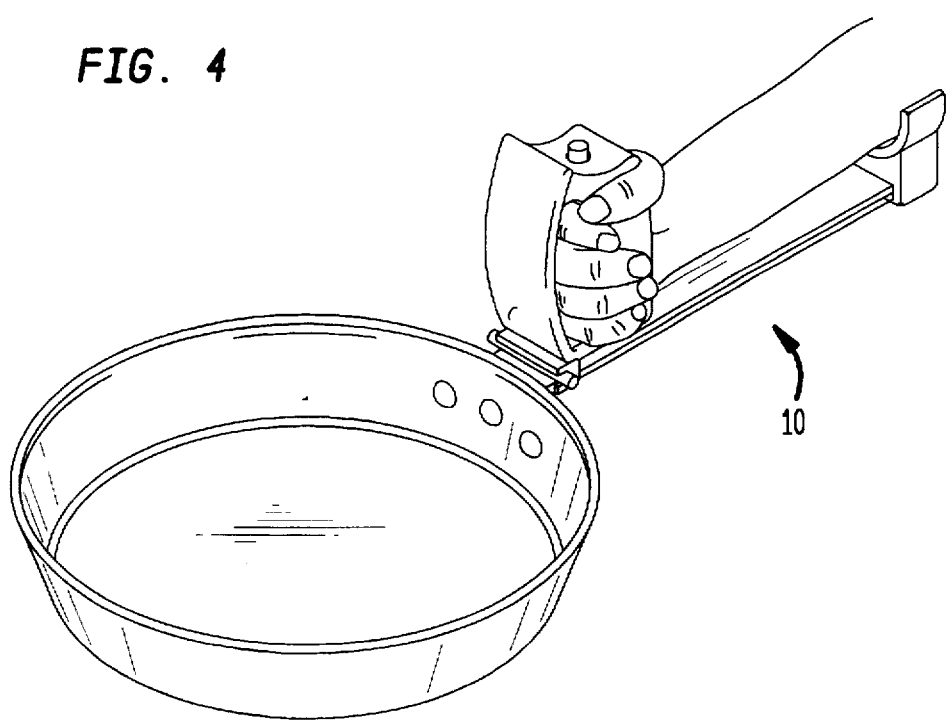
Figure 5:
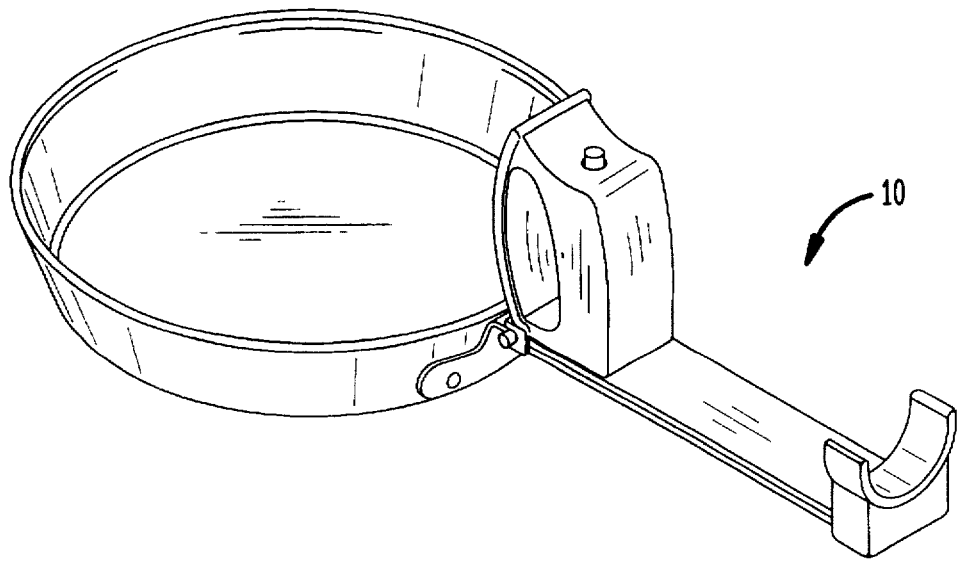
Figure 6:
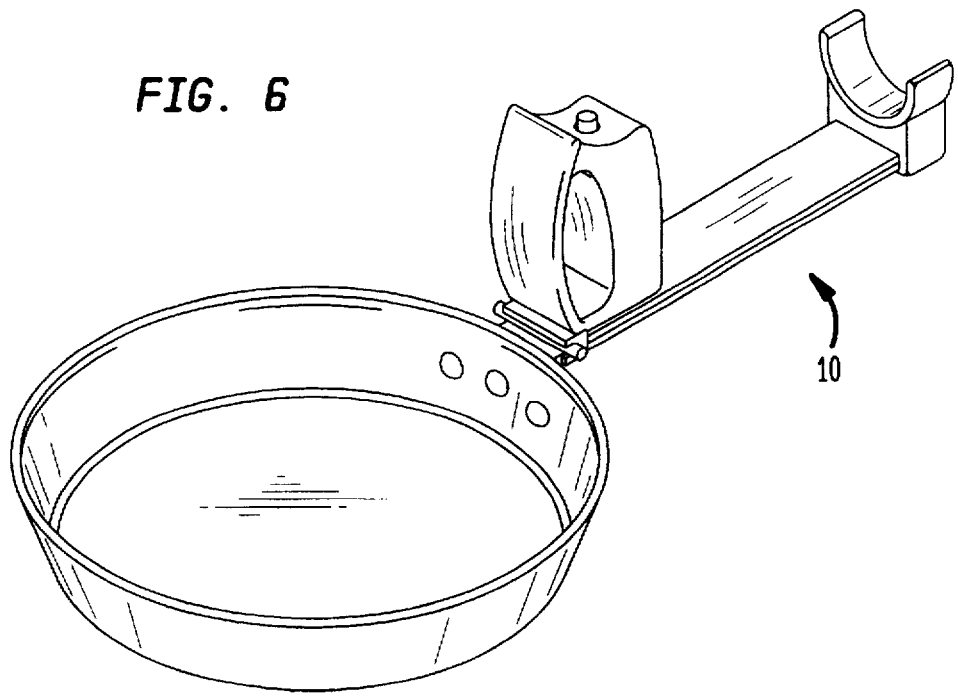
Figure 9:
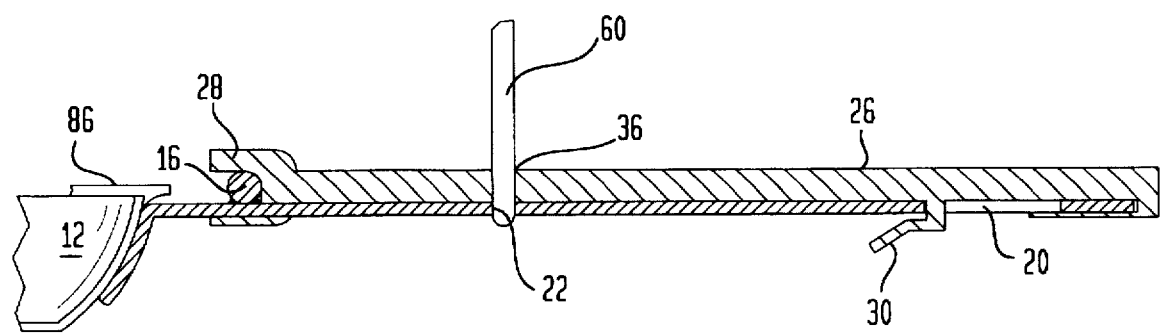
FIGS. 9–12 show views of the elements of the handle adapter and the cooking utensil constructed for coaction with the adapter.
Figure 10:
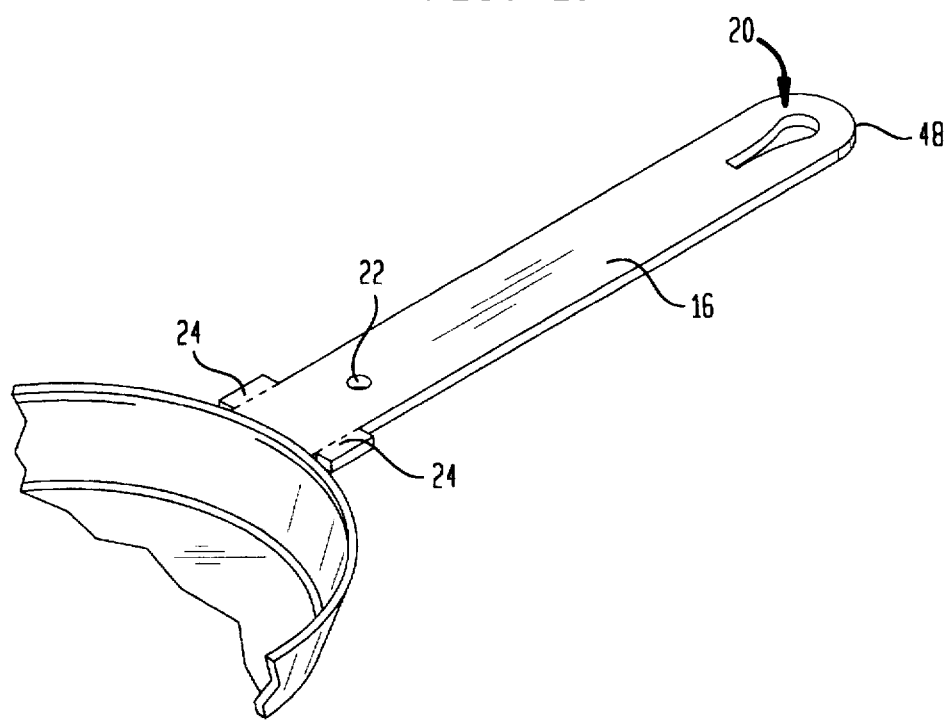

Referring in particular to FIGS. 9, and 10, the handle 16 includes a flange or cylindrically shaped spur 18 proximate to where the handle 16 is joined to the pan 12. The opposite end of the handle 16 is formed with an elongated tear drop-shaped slot 20, the purpose of which will be described hereinafter. Additionally, an aperture 22 is formed through the handle 16 intermediate the spur 18 and the slot 20 to receive a mounting element of the adapter 10. As shown in FIG. 10, a portion of the handle 16 near the pan 12 is formed with extensions 24 to further buttress and provide support to the adapter 10 when it is mounted to the handle 16.

The adapter 10 includes an elongated arm 26, having at one end a U-shaped member 28 and at an opposite end a finger-like protrusion 30. The arm 26 is sized and shaped to conform to the dimensions of the handle 16 when mounted thereto, as also shown in FIGS. 4–8. The U-shaped member 28 has a trough 32 in which the spur 18 of the handle 16 is received. A lower section 34 of the Ushaped member 28 has a portion removed so that the lower section 34 resembles a pair of prongs straddling opposed side edges of the handle 16 (FIG. 8). The lower sections 34 of the U-shaped member 28 will preferably abut against the handle 16 extensions 24 as shown in FIG. 9. The finger-like protrusion 30 is preferably formed integral with the arm 26 and extends perpendicular to the longitudinal axis of the arm 26, after which it is bent in a direction toward the U-shaped member 28 of the arm 26. An aperture 36 is formed in the arm 26 intermediate the U-shaped member 28 and the finger-like protrusion 30, the aperture 36 arranged for registration with the handle aperture 22 when the adapter 10 is disposed over the handle 16 for mounting thereto.

Figure 11:
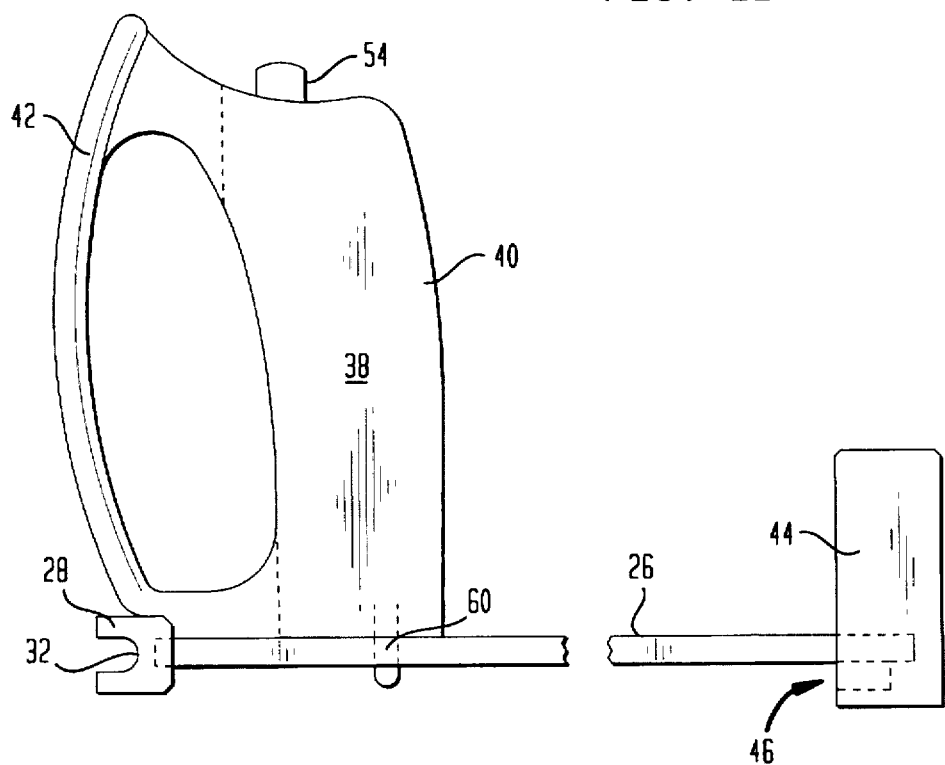
Figure 12:
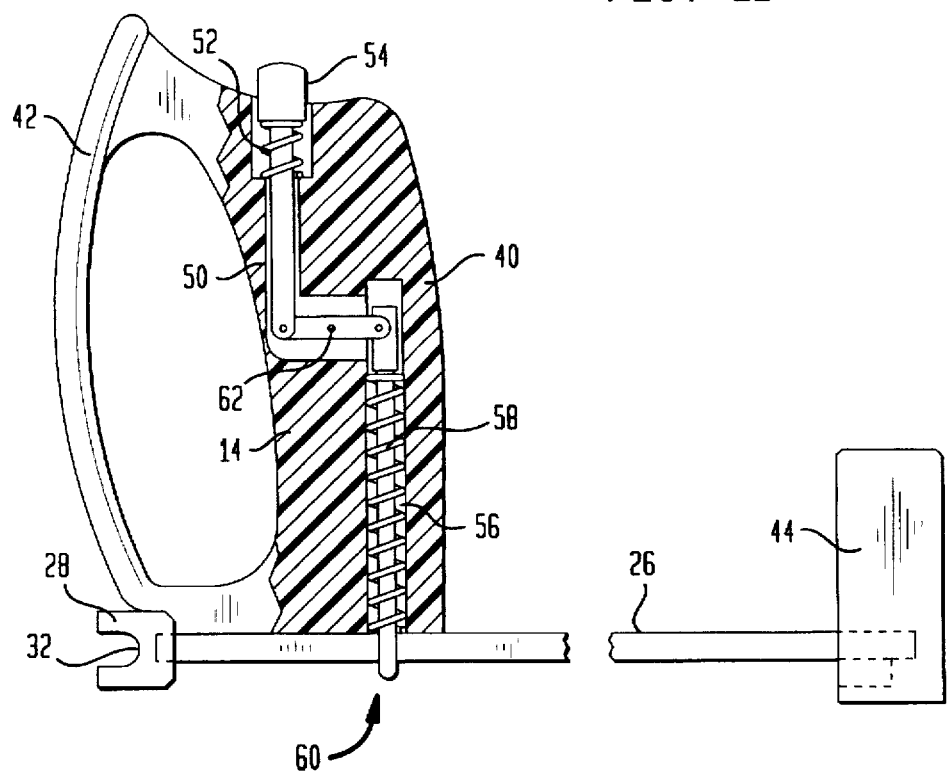

Referring also to FIGS. 11 and 12, the adapter 10 includes an ergonomically shaped grip 14 mounted to the arm 26 proximate the Ushaped member 28. A portion of the grip 14 straddles a portion of the U-shaped member 28. The grip 14 includes a body portion 40 to house mounting elements of the adapter 10, and a shield 42 extending and spaced from the grip 14 to function as a knuckle guard between which the user's fingers are extended to wrap around the grip 14. The shield 42 is constructed with a concave surface area extending substantially wider than a width of the handle 16 or arm 26 so that the user's hand is protected from flames or heated products in the pan or on the stove.

An opposite end of the arm 26 is provided with a curved or concave plate which functions as an armrest 44. The armrest 44 is formed with a pocket 46 to receive an end 48 of the handle 16.

The grip 14 includes elements to removably mount the grip 14, arm 26 and armrest 44 to the handle 16 as shown in FIGS. 11 and 12. The grip 14 is formed with a first bore 50 extending from a top of the body portion 40 of the grip 14 approximately one third of the way down into the grip 14. A first spring 52 is disposed in the lower portion of the first bore 50 to provide reciprocating movement for a control button 54 which extends from the top portion of the grip 14. The first bore 50 extends substantially parallel with a longitudinal axis of the grip 14 and is in communication with a second bore 56 of the grip 14 also extending substantially parallel with the longitudinal axis of the grip 14. A second spring 58 is mounted for reciprocating movement in the second bore 56. A guide pin 60 is disposed at a lower end of the second bore 56 and coacts with the second spring 58 in the second bore 56 to move the guide pin 60 between a retracted position in the second bore 56 of the body portion 40, and an extended position wherein the guide pin 60 protrudes from the second bore 56 through the arm aperture 36 and handle aperture 22. The first and second springs 52,58 coact about a pivot member 62. Reciprocating movement of the first spring 52 effects reciprocating movement of the second spring 58 at the pivot 62. The guide pin 60 is used to attach and detach the grip 14, and hence the arm 26 of the adapter 10 to the cooking utensil handle 16. The control button 54 and the pivot member 62 coact to provide a locking feature.

The method in which the adapter 10 is removably mounted to the handle 16 will now be described. The user takes hold of the grip 14 and rests his arm in the armrest 44. The finger 30 on the arm 26 of the adapter 10 is disposed in the slot 20 of the cooking utensil handle 16 so that the end 48 of the handle 16 is received in the pocket 46 of the armrest 44. The adapter arm 26 is lowered onto the handle 16 to align the U-shaped member 28 at the end of the arm 26 with the spur 18 on the handle 16 so that the spur 18 is received in the trough 32 of the U-shaped member 28. The second bore 56 of the body portion 40 is accordingly moved into registration with the aperture 36 in the arm, which is accordingly in registration with the aperture 22 in the handle 16 so that when the arm 26 is disposed on the handle 16, the guide pin 60 can be extended through the apertures 22,36. The control button 54 is then depressed locking the guide pin 60 into an extended position through the apertures 22,36. The adapter 10 is therefore mounted to the handle 16 securely to control the cooking utensil through any range of motion. The mounting operation of the adapter 10 to the cooking utensil handle 16 can be accomplished in a single handed operation.

Similarly, release of the adapter 10 from the cooking utensil handle 16 is easily accomplished by depressing the control button 54 again to remove the guide pin 60 from the apertures 22,36, and pulling back slightly on the grip 14 to remove the U-shaped member 28 from the spur 18 and the finger 30 from the slot 20 in the handle 16.

Alternatively, the control button 54 and springs 52,58 can be arranged to operate as a "dead-man switch", in which the springs 52,58 maintain the guide pin 60 in an extended position from the bottom of the grip 14, whereupon depressing the control button 54 retracts the guide pin 60 to permit mounting of the adapter 10 to the cooking utensil handle 16.

Other embodiments of the present invention call for the grip 14 of the adapter 10 to be constructed to releasably receive interchangeable mounting assemblies depending on the cooking utensil and/or tool to which the handle 16 is to be mounted.

Figure 13:
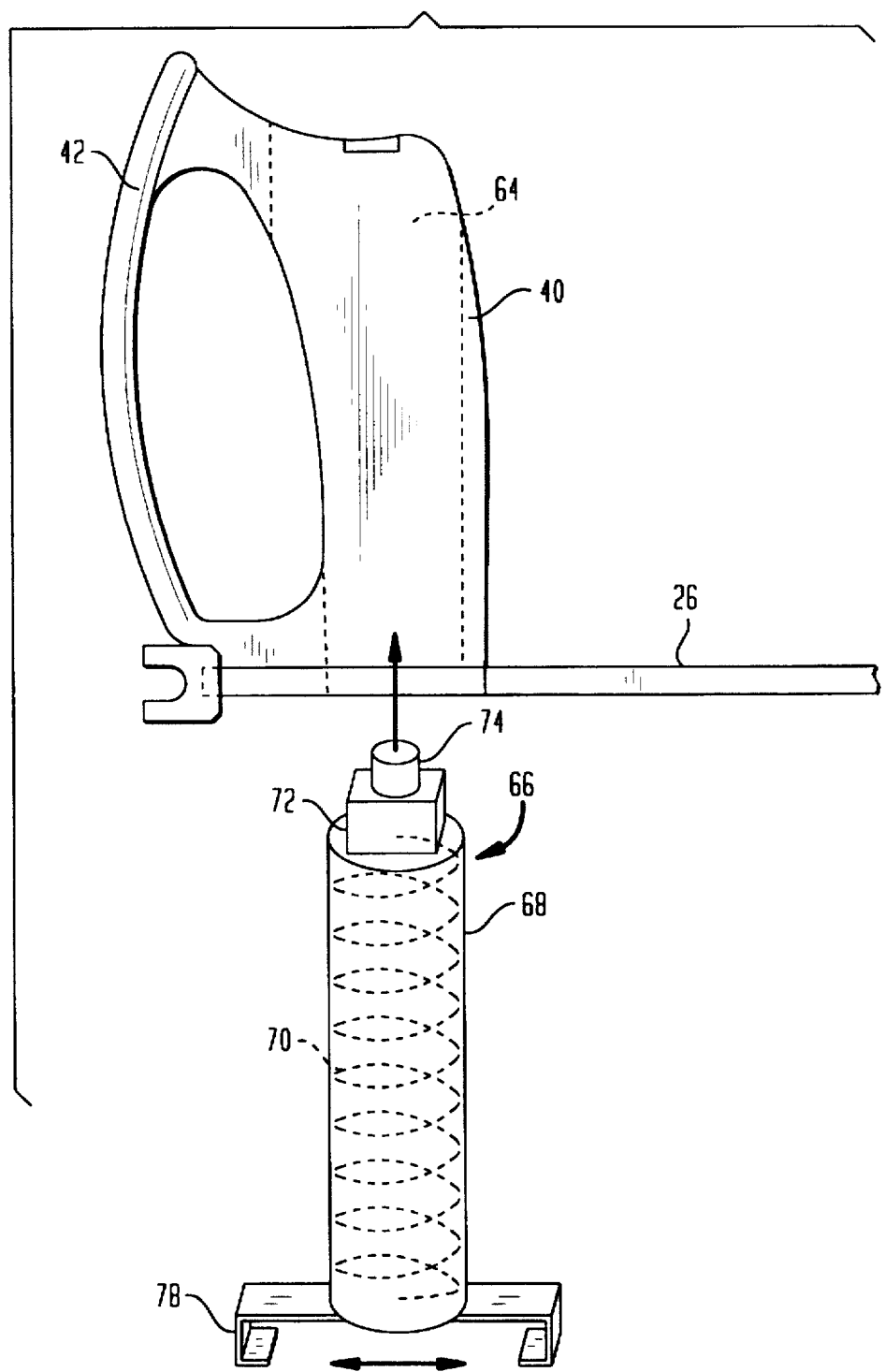
FIG. 13 shows another embodiment of the handle adapter according to the present invention.

Referring to FIG. 13, the body portion 40 of the grip 14 is formed with a central bore 64 to receive a discrete self-contained mounting assembly 66. The mounting assembly 66 includes a drumshaped element 68 in which a spring 70 is housed, a platform 72 and a control button 74 extending from the platform 72. A pair of Ushaped brackets 76,78 are mounted to the drum 68 at opposed sides thereof. The brackets 76,78 are biased with respect to each other (arrow) by actuation of the control button 74 which extends from a top portion of the assembly 66. The central bore 64 of the body portion 40 and the mounting assembly 66 can be constructed for threaded engagement (arrow). Other constructions of the assembly can be employed to removably mount the assembly 66 to the body portion 40. Actuation of the button 74 biases the opposed brackets to grip or release a cooking utensil handle 16 disposed therebetween.

Figure 14:
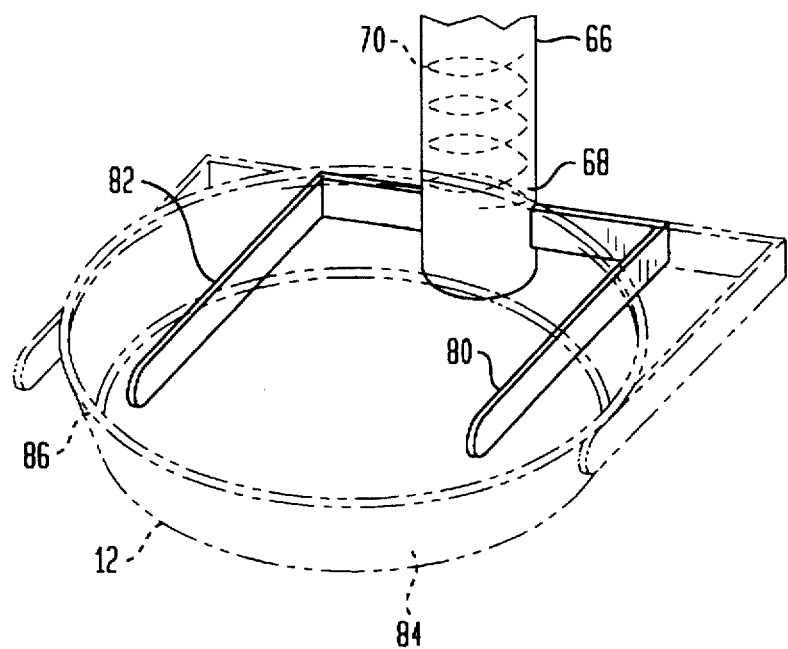
FIG. 14 shows still another embodiment of the handle adapter according to the present invention.

In FIG. 14, another embodiment of the present invention is shown. In FIG. 14, the mounting assembly 66 is removably mounted to the body portion 40 of FIG. 13 in a similar manner, and includes a pair of spaced-apart arms 80,82 which are biased with respect to each other to receive a sidewall 84 of the pan 12 therebetween. In particular, certain pots, pans, and the like are constructed with a flange or lip 86 around the opening of the pan 12, also as shown for example in FIG. 9. The arms 80,82 of the adapter mounting assembly 66 shown in FIG. 14 can be biased to extend along opposed portions of the sidewall 84 of the pan 12 and abut against an underside of the lip 86 of the pan 12 as well. This facilitates lifting the pan 12 from the cooking area. Arms of different size and spacing, such as shown in the broken lines of FIG. 14, can be employed depending on a diameter of the sidewall of the pan 12. The arms 80,82 can be constructed to coact with the side extensions 24 on the pan handle 16.

Figure 15:
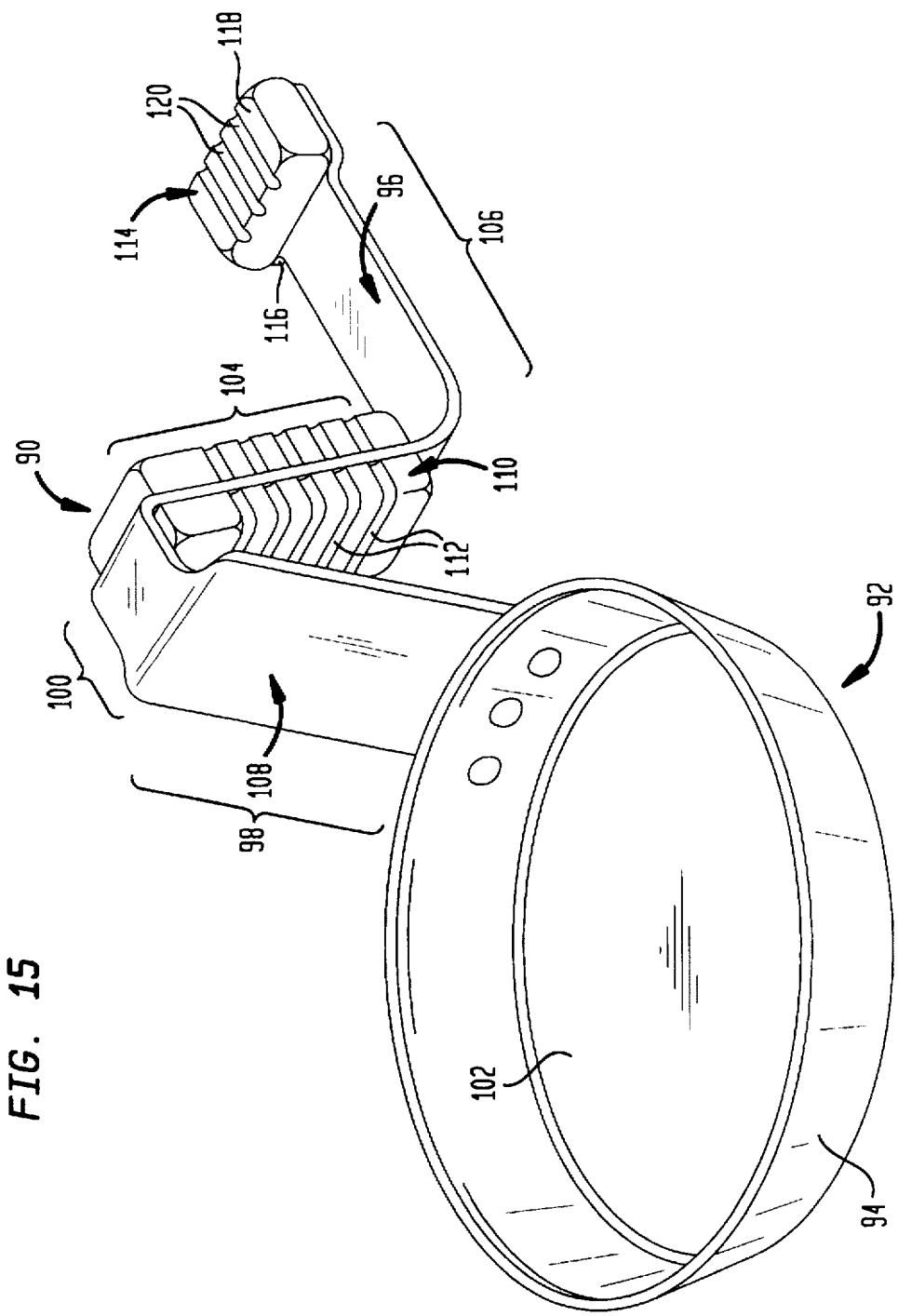
FIG. 15 shows a cooking utensil having a non-removable handle according to the invention.

Referring to FIG. 15, still another embodiment is shown of an adapter 90 according to the present invention, which is fixedly attached to a cooking utensil 92 having a body portion 94.

The adapter 90 includes an arm 96 connected to the body portion 94 by rivets on other known mechanical or chemical fasteners. The arm 96 includes a region 98 which extends upward away from the body portion 94 of the cooking utensil 92, after which the arm 96 is bent at region 100 in a direction away from and substantially parallel to a bottom 102 of the cooking utensil 92. The substantially parallel, flat transition region 100 provides for a clear line of sight to the cooking utensil 92 when employed during a cooking operation. The arm 96 is then bent downward at a region 104 which approaches a 90° angle with respect to the region 100. It is preferred that the region 104 of the arm 96 only approaches the 90° angle because a 90° angle of region 104 would put an unnecessary strain on the user's hand (not shown) when the adapter 90 is gripped for a cooking operation. The arm 96 is again bent to extend along a region 106 which is preferably substantially parallel with region 100 and the bottom 102 of the cooking utensil 92. In all the regions 98,100,104,106 where the arm 96 is exposed, a surface area of the arm 96 is smooth so as to reduce rough edges and provide for a more streamlined appearance.

The region 98 of the arm 96, which resembles a longitudinal member, has a substantially flat planar face 108 which functions as a shield or splash guard. The shield 108 is formed of a size and shape having dimensions which include a width greater than a width of the regions of the arm 96. This width provides for the "shielding" effect when a user grips the adapter 90. It is also preferred that the width of the shield 108 is substantially wider than the user's fist so that heated materials which inadvertently stray from the cooking utensil 92 will not contact the user's hand.

A hand grip 110 is mounted to the region 104 of the arm 96. As shown in FIG. 15, the hand grip 110 can consist of two separate parts, each of which is mounted to a corresponding opposed side of the arm 96 at the region 104. The hand grip 110 can also be formed as a single piece having an open ended groove formed therealong constructed and arranged to receive the region 104 of the arm 96. A plurality of grooves 112 separate and discrete from each other and formed in the hand grip 110. The grooves 112 are preferably constructed along the hand grip in a parallel relationship with each other. The grooves 112 facilitate gripping the adapter 90 and in the heated cooking environment, permit air to circulate between the user's hand and the grip to dissipate perspiration. The plurality of grooves 112 also provide for runoff of perspiration from the user's hand. As shown in FIG. 15, edges of the hand grip are bevelled and contoured to facilitate gripping and reduce stress during extended cooking operations.

The hand grip 112 can be joined to the region 104 of the arm 96 by friction or press fit, but it is preferred that mechanical or chemical fasteners be employed to secure the hand grip 110 to the arm 96.

A support member 114 is attached to an end of the arm 96 at the region 106. The support 114 is provided with an open ended recess 116 formed therein to receive the end of the arm 96. Alternatively, the support 114 is connected to the end of the arm 96 by mechanical or chemical fasteners. The support 114 can be constructed and arranged to contact the user's arm, at either an area of the user's arm proximate the wrist, or closer to the forearm. The positioning of the support 114 with respect to the user's arm is dependent upon the length of the region 106 of the arm 96. That is, the longer the region 106 is, the further the support 114 will be from the hand grip 110, thereby disposing the support 114 for contact with the user's forearm. Conversely, if the region 106 is of a relatively short length, the support 114 will more than likely impact the user's arm closer to the wrist. Therefore, depending upon the weight of the cooking utensil 92, the strength of the user and the amount of time the adapter 90 will be used, this will determine which part of the user's arm the support 114 is to contact. For example, in commercial settings, where a relatively heavy cooking utensil 92 is being employed, more than likely the region 106 will be of a length sufficient to provide for the support 114 contacting the user's forearm so that there is considerably less stress on the user's wrist, with the user's biceps and forearm muscles being employed to control the cooking utensil. In relatively short cooking operations, such as those for sauces, it is not necessary that the region 106 of the arm 96 be of such a length, as it is only necessary that support 114 contact an area proximate the user's wrist as the cooking operation will not extend for an unusually long period of time.

An upper surface 118 of the support 114 is concave to substantially conform to the shape of the user's arm. The support member 114 is also provided with a plurality of grooves 120 separate and discrete from each other and preferably parallel with each other. The grooves 120 fulfill a similar function as described with respect to the plurality of grooves 112.

The materials from which the adapter 10 and mounting assemblies of the present invention are constructed are preferably polymers and other plastics which can withstand the heat and cooking products, resist corrosion and are easily cleansed and maintained. The arms, the U-shaped member and the finger are preferably formed of aluminum or other alloy having similar characteristics.

The hand grip 110 and the support member 114 can be manufactured from high density, heat resistant rubber materials, as well.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. A handle adaptor for use with a handle of a cooking utensil, comprising;
    a support member constructed and arranged to be operatively associated with the handle;
    a hand grip attached to said support member, said hand grip having:
    a body portion adapted to be gripped by a user's hand, and
    a shield portion extending from and spaced forwardly of said body portion, said shield portion having a surface area extending substantially wider than a width of the user's hand to shield the hand; and
    means to removably mount the support member to the handle.

2. The handle adaptor of claim 1, wherein said support member comprises;
    an elongated arm sized and shaped to rest upon the handle when mounted thereto; and
    an arm rest having:
    a base portion connected to an end of said elongated arm remote from said hand grip and extending upward from said elongated arm to provide a concave opening adapted to accommodate and support the user's forearm.

3. The handle adaptor of claim 2, wherein said means to removably mount the support member to the handle comprises:
    a pair of apertures arranged in the handle with one of the apertures near an end of the handle in registration with the base portion of the arm rest,
    a first pin member operatively associated with the body portion to extend through the elongated arm for engagement with one of the pair of apertures closest to the utensil.

4. The handle adaptor of claim 3, wherein said mounting means further comprises;
    a finger extending from the elongated arm and inclined towards said cooking utensil to engage a second one of the pair of apertures furthest from the cooking utensil.

5. The handle adaptor of claim 4, further comprising:
    a spur extending from the handle adjacent the cooking utensil; and
    a U-shaped member at an end of said elongated arm spaced forwardly of said hand grip to receive the spur of the handle.

6. The handle adaptor of claim 5, wherein the handle further comprises:
    projections extending from opposite sides of the handle adjacent the utensil, said projections adapted to abut against the U-shaped member when said elongated arm is mounted to the handle.

7. The handle adaptor of claim 2, wherein the arm rest further comprises:
    a pocket formed in the base portion of the arm rest for removably receiving an end of the handle.

8. The handle adaptor of claim 3, wherein the body portion of the hand grip comprises:
    a first bore extending substantially parallel with a longitudinal axis of said body portion;

a second bore extending substantially parallel with a longitudinal axis of said body portion and in communication with the first bore;

a control button extending from the hand grip at the first bore;

a first spring disposed in the first bore to provide reciprocating movement of said control button;

a second spring mounted in said second bore for providing reciprocating movement of said first pin member;

a pivot member mounted in said base portion to interconnect said first and second springs for coaction;

wherein the coaction between the control button, the first spring and the second spring permits the first pin member to move between a retracted position in the second bore of said body portion, and an extended position to protrude from said second bore to engage the aperture in the arm closest to the cooking utensil.

9. The handle adaptor of claim 1, wherein the body portion of the hand grip includes a central bore, and said mounting means is adapted to be disposed in the central bore of the hand grip.

10. The handle adaptor of claim 9, wherein said mounting means comprises:

a container;

a biasing means disposed in the container;

a control button adapted to coact with the biasing means and extend from the container and the hand grip when said mounting means is disposed in the hand grip;

a pair of brackets mounted to the container at opposed sides thereof, the pair of brackets operatively associated with the biasing means to be biased with respect to each other upon coaction of the control button with the biasing means.

11. The handle adaptor of claim 10, wherein said body portion of said hand grip and said container of the mounting means have complimentary threaded portions for threaded engagement with each other.

12. The handle adaptor of claim 10, wherein the brackets are constructed and arranged for biased movement with respect to each other to grip the handle.

13. The handle adaptor of claim 10, wherein the brackets are constructed and arranged for biased movement with respect to each other to engage opposed portions of a sidewall of the cooking utensil.

14. A handle assembly for a cooking utensil, comprising:

a longitudinal member connected to the cooking utensil and extending therefrom, the longitudinal member having a first width greater than a width of a user's hand for shielding a user's hand;

gripping means attached to the longitudinal member and having a second width less than the first width of the longitudinal member;

a transition portion interconnecting the longitudinal member and the gripping means, the transition portion substantially parallel to a bottom of the cooking utensil; and support means extending from the gripping means for coaction therewith to support a region of the user's arm when the gripping means is gripped.

15. The handle assembly of claim 14; wherein the gripping means comprises:

a plurality of grooves formed therein, the grooves separate and discreet from each other, and substantially perpendicular with each other.

16. The handle assembly of claim 14, wherein the support means comprises:

a platform having a surface with a concave shape to contact and substantially accommodate a region of the user's arm.

17. The handle assembly of claim 16, wherein the platform comprises:

a plurality of grooves formed therein, the grooves being separate and discreet from each other, and substantially perpendicular to each other.

18. The handle assembly of claim 14, wherein the handle is adapted to be removably mountable to the cooking utensil.

19. The handle assembly of claim 14, wherein the longitudinal member, the transition portion, and the support means are formed integral with each other.

20. A cooking device to substantially reduce stress upon an arm of a user and facilitate control during a cooking operation, the device comprising:

a cooking utensil having:
  a body portion into which material to be cooked is deposited;

a handle having:
  a first end connected to said body portion and extending therefrom,
  a first aperture formed in the handle,
  a spur projecting from an area of said handle proximate to the body portion of the cooking utensil,
  projections extending at opposed sides of the handle adjacent the spur,
  an elongated slot formed in a second end of the handle at a portion thereof remote from the body body portion of the cooking utensil;

an adaptor assembly having:
  an elongated arm sized and shaped to conform to the handle when mounted thereto,
  a second aperture formed therethrough;
  a hand grip connected to said elongated arm, said hand grip adapted to be grasped by the user's hand,
  a shield portion extending from and spaced forwardly of said body portion to provide a space between the shield and the body portion, said shield portion having a concave surface area with a width substantially wider than a width of the user's hand to protect the hand from the cooking environment, an arm rest having:
  a base portion connected to the said elongated arm, the base portion having a concave surface area adapted to accommodate and support a portion of the user's arm rearwardly of said hand grip,
  an integral finger-like protrusion extending from the elongated arm inclined toward said utensil,
  a U-shaped member at an end of said arm spaced forwardly of said hand grip,
  said U-shaped member having upper and lower ends and a trough intermediate said upper and lower ends adapted to removably receive the spur of the handle,
  a pocket formed in the base portion of said arm rest for removably receiving the second end of said handle, means for removably mounting the adaptor to the handle, including:
  a pin member detachably extending therethrough and securing said first and second apertures in registration with each other to maintain the adapter in position on the handle;
  said longitudinal slot in the handle in registration with said finger-like protrusion and adapted to removably receive the finger-like protrusion, wherein said projections extending from opposed sides of the handle abut against a lower end of said U-shaped member when said arm is mounted to the handle.

* * * * *